March 3, 1936.  L. OVERLAND ET AL  2,032,434
APPARATUS FOR MAKING CONFECTIONS
Filed March 8, 1933  2 Sheets-Sheet 1
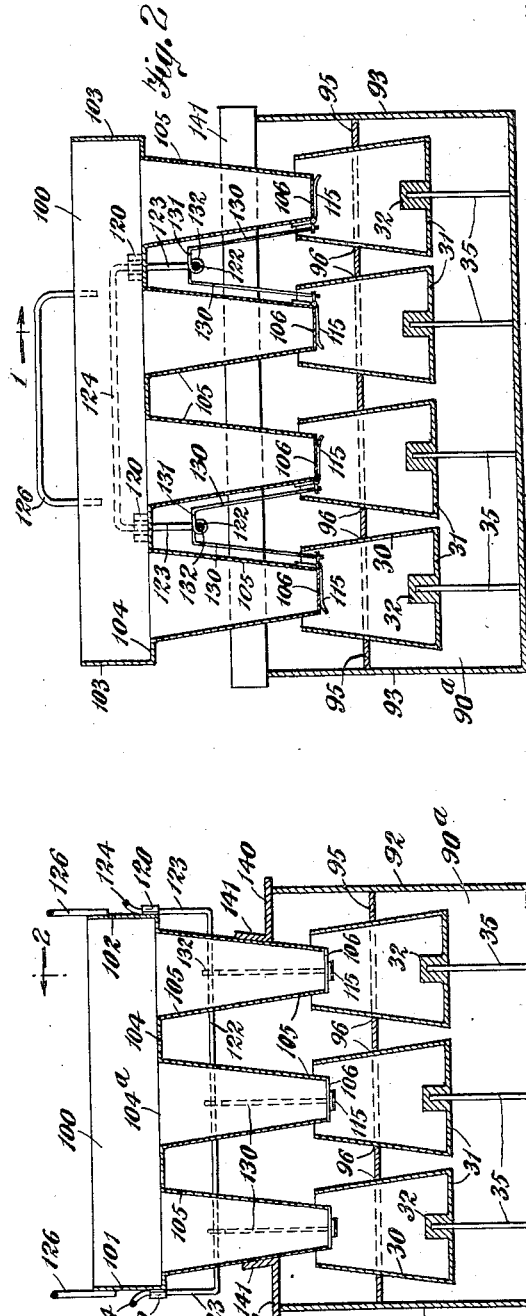
INVENTORS
LEO OVERLAND AND
BENJAMIN BRENNER
BY
A. A. de Bonneville
ATTORNEY March 3, 1936. L. OVERLAND ET AL 2,032,434
APPARATUS FOR MAKING CONFECTIONS
Filed March 8, 1933 2 Sheets-Sheet 2
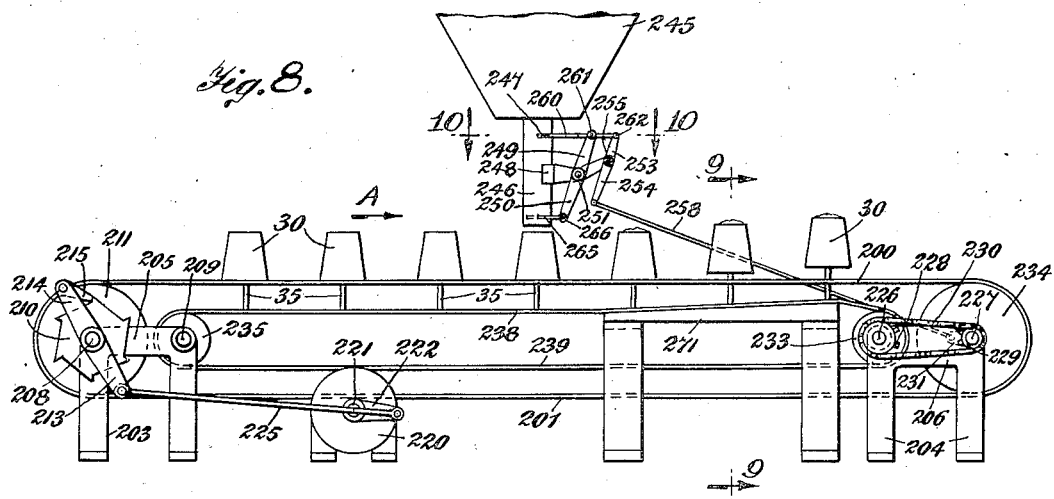
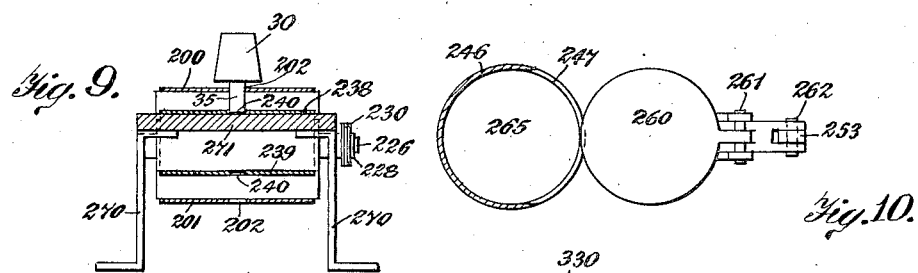
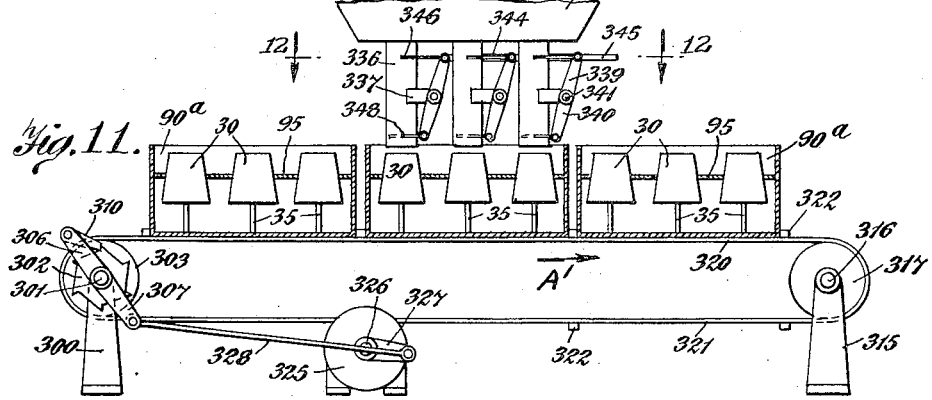
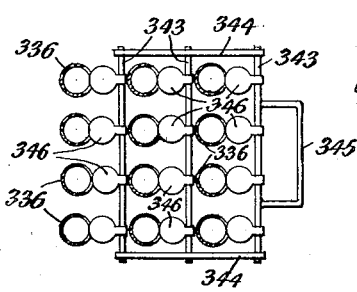
INVENTORS
LEO OVERLAND AND
BENJAMIN BRENNER
BY
ATTORNEY Patented Mar. 3, 1936

2,032,434

UNITED STATES PATENT OFFICE 2,032,434

APPARATUS FOR MAKING CONFECTIONS

Leo Overland and Benjamin Brenner,
Brooklyn, N. Y.

Application March 8, 1933, Serial No. 660,039

3 Claims. (Cl. 107—28)

This invention relates to depositors.

One of the objects of the invention is the production of depositors for charging moulds to produce the shell of a confection and also to charge said shells with confections to produce a single flavored or a double or multiple flavored confection.

In the accompanying drawings Fig. 1 shows a section on the line 1, 1 of Fig. 2 of an exemplification of a multiple manually operated depositor, in this instance for the shells of confections; Fig. 2 is a section of Fig. 1 on the line 2, 2; Fig. 3 shows an enlarged fragmentary portion of Fig. 2; Fig. 4 indicates a bottom view of Fig. 3; Fig. 5 shows an elevation partly in vertical section of a multiple power driven depositor, in this instance for the shells of confections; Fig. 6 represents an enlarged fragmentary portion of Fig. 5 and a section on the line 6, 6 of Fig. 7; Fig. 7 shows a bottom view of the portion of the depositor shown in Fig. 6; Fig. 8 represents a side elevation for a multiple power driven depositor, in this instance for a single line of shells for confections; Fig. 9 is an enlarged cross-section on the line 9, 9 of Fig. 8; Fig. 10 shows an enlarged section of Fig. 8 on the line 10, 10; Fig. 11 indicates a side elevation partly in cross-section of a multiple depositor manually operated, and power driven receiving apparatus in this instance for confections and Fig. 12 is a section of Fig. 11 on the line 12, 12.

Referring to Figs. 1, 2, 5, 8, and 11 of the drawings there are indicated containers for confections, which each comprises the conical shaped shell 30 open at its top end, and the flat bottom wall 31, having integral therewith the inwardly extending cylindrical supporting lug 32. The said shell with its parts preferably comprise a hardened candy, chocolate and the like, which when manufactured are formed simultaneously. A supporting stick 35 of wood or eatable material, is indicated to have one end thereof extending from the lug 32.

Referring to Figs. 1 to 4 inclusive, a multiple manually operated depositor is indicated with a receiving apparatus. Said apparatus comprises the box indicated in its entirety by the numeral 90a. The said box is shown with the front wall 91, rear wall 92, the side walls 93 and the bottom wall 94. Within the said box is indicated the loose partition 95 having a plurality of openings 96. In this instance, the shells 30 of the confections are indicated with their bottom walls 31, lugs 32 and the sticks 35. The said shells 30 extend through the openings 96 of the partition 95, and the sticks 35 are shown with their lower ends bearing upon the bottom wall 94 of the box 90a. The multiple manually operated depositor is indicated in its entirety by the numeral 100. The said depositor comprises the upper rectangular filling tank having the front wall 101, the rear wall 102, side walls 103, and the bottom wall 104. The wall 104 has formed therein a plurality of openings 104a. From the bottom wall 104, and in alignment with the openings 104a, extend the tapered discharge nozzles 105, which at their lower open ends, have hinged thereto the valves 106, by means of the hinge pins 107. Each of the valves 106 has extending therefrom the extension 110, having the opening 111. A plate spring 115 has its bifurcated end with its portions 116 thereof fastened to its accompanying discharge nozzle 105, and its other end 117 normally bears against the lower face of its accompanying valve 106. It will be noted that the valves 106 are indicated in pairs which are oppositely positioned to each other. To the front and rear walls 101 and 102 of the depositor 100, are fastened the guide lugs 120. Operating bars are indicated at 122 which each have extending therefrom the vertical members 123, connected by the operating handles 124. The vertical members 123 are guided in the guide lugs 120. Handles 126 are fastened to the walls 101 and 102. U shaped connecting bars are indicated as having each the longitudinal members 130 and the upper member 131, with the eye 132. The eyes 132 engage the operating bars 122. The lower ends of each longitudinal member 130 has integral therewith the hook end 135, which engages the opening 111 of its adjacent door 106. A supporting cover is shown with the horizontal members 140 and the inclined members 141. The inclined members 141 are fastened to the walls of the adjacent tapered discharge nozzles 105. It will be noted that when the parts of the depositor are in position, the members 140 bear upon the walls 91 and 92 of the box 90a. It will also be noted that the lower ends of the discharge nozzles 105 extend into the upper ends of the shells 30.

The multiple manually operated depositor is used as follows. The shells 30 with their appurtenances are placed within the box 90a as already described and shown in the drawings. The valves 106 of the discharge nozzles 105 are automatically maintained in their closed position by the tension of the springs 115. The operator then fills the nozzles 105 with the liquid or semi-frozen confection through the openings 104a. The contents of each of the discharge nozzles 105 are each enough to fill their accompanying shells 30. The operating handles 124 are now pulled up which open the valves 106 and the contents of the discharge nozzles 105 are deposited into the shells 30. On releasing the operating handles 124, the valves 106 are automatically closed by the tension of the springs 115. The depositor 100 is now removed by means of the handles 126. The operator then takes the box 90a with its contents, covers the same with a cover and the box 90a with its contents is subjected to further refrigeration.

Referring to Figs. 5 to 7 inclusive, a multiple power driven depositor is indicated which comprises the filling tank 150, having the front wall 151, rear wall 152, the inclined side walls 153 and the bottom wall 154. The bottom wall 154 has a plurality of openings 155 therein. From the bottom wall 154, and in line with its openings 155, extend a plurality of discharge nozzles 156. To the lower end of each discharge nozzle 156 is hinged the valve 158 by means of the hinge pin 159. A spring 160 for each discharge nozzle has its bifurcated portions thereof, as indicated in 161, fastened to the said discharge nozzle. Its other end 162 bears against its accompanying valve 158. By means of said springs 160, each valve 158 is automatically and normally maintained in closed position. The tank 150 is supported upon the legs 165. In the tank 150 are indicated a plurality of guide bars 167, which have their ends fastened to the walls 151 and 152. Through each of the guide bars 167 is guided a plunger rod 170, which at its lower end has fastened thereto a plunger 171 adapted to enter its accompanying discharge nozzle 156. A beam 175 connects the upper ends of the plunger rods 170. A bracket 178 extends from the wall 151 and has journaled thereto the bell crank, having the arms 179 and 180. The arm 179 has an elongated opening 181 which engages a pin 182 extending from the beam 175. An electric motor 185 has connected to its armature shaft the worm 186. The said motor is supported upon the foundation block 187. A bracket 190 has one end fastened to the block 187, and in its other end is journaled a shaft 191 to which is fastened the worm wheel 192. The latter is in mesh with the worm 186. A connecting rod 195 has one end pinned to the worm wheel 192 and its other end is pinned to the bell crank arm 180. Below the tank 150 is indicated the box 90a with its bottom wall 94, with its partition 95 and the shells 30 with their sticks 35, as already described.

The mulitple power driven depositor is operated as follows. The tank 150 is filled with its liquid or semi-liquid or semi-frozen confection, and the box 90a is located in place. The operator starts the motor 185 by means of which the bell crank having the arms 179 and 180, through the intervening mechanism, is oscillated. By this means the plunger rods 170 are reciprocated with their plungers 171. By this means, the discharge nozzles 156 are filled with the liquid or semi-frozen confection. After the discharge nozzles 156 have been filled, the plungers 171 contacting with the upper faces of the confection in the said discharge nozzles 156, the said confection bears upon the valves 158 and is discharged from said nozzles 156, and enters the shells 30. When the discharge nozzles have been emptied, the valves 158 automatically close the lower open ends of the discharge nozzles 156 by the tension of the springs 160. It is to be noted that the contents of the discharge nozzles 156 are just enough to fill the shells 30. After the shells 30 have been filled, the box 90a is removed, and closed with a cover, and its contents treated as already described for Figs. 1 and 2.

Referring to Figures 8 to 10 inclusive, the multiple power driven depositor for a single line of shells is indicated. This modification comprises the conveyer having the parallel members 200 and 201. The said conveyer has formed therein a plurality of openings 202. Adjacent to each end of the conveyer are positioned the pairs of supporting frames 203 and 204. Only one of each pair is indicated in the drawings. Each pair of supporting frames 203 has integral therewith the upper member 205. Each pair of the supporting frames 204 has integral therewith the upper member 206. Shafts 208 and 209 are journalled in the members 205. A ratchet wheel 210 is fastened to the shaft 208, and a pulley 211 is fastened to said shaft 208. A lever having the arms 213 and 214 is pivoted on the shaft 208. A pawl 215 is pivoted to the outer end of the arm 214 and is adapted to coact with the ratchet wheel 210. An electric motor is indicated in its entirety by the numeral 220. The armature shaft 221 of said motor has fastened thereto one end of the crank 222. A connecting rod 225 connects the arm 213 and the crank 222. Shafts 226 and 227 are journalled in the upper members 206 of the supporting frame 204. A sprocket wheel 228 is fastened to the shaft 226 and a sprocket wheel 229 is fastened to the shaft 227. A sprocket chain 230 connects said sprocket wheels. A crank 231 has one end fastened to the shaft 227. A roller 233 is fastened to the shaft 226. A pulley 234 is fastened to the shaft 227 and a roller 235 is fastened to the shaft 209. A belt having the members 238 and 239 connects the rollers 233 and 235. The belt having the members 238 and 239 has formed in its outer surface a plurality of indentations 240. Above the conveyer having the members 200 and 201 is indicated a filling tank 245 which has depending therefrom the discharge nozzle 246. The said nozzle has indicated therein the opening 247. A bracket 248 extends from said nozzle 246. A lever having the arms 249 and 250 is pivoted to the bracket 248 by means of the pivot 251, and a second lever having the arms 253 and 254 is pivoted to the bracket 248 by means of the pivot 255. A connecting rod 258 has one end pivoted to the arm 254 and its other end is pivoted to the crank 231. A circular plate valve 260 is pivoted to the arm 249 by means of the pivot 261, and also to the arm 253 by means of the pivot 262. The said valve 260 is adapted to extend through the opening 247 and into the discharge nozzle 246. To the arm 250 is pivoted a plate valve 265 similar to 260 by means of the pivot 266. The plate valve 265 also extends through an opening of, and into the discharge nozzle 246. A pair of Z-shaped supporting brackets 270 support the inclined guide plate 271 which bears up against the member 238 of the belt heretofore described. The shells with their sticks are again indicated at 30 and 35. The said shells are supported upon the member 200 of the conveyer and the sticks 35 extend through the openings 202 thereof, while the lower ends of the said sticks engage the indentations 240 of the member 238 of the belt already described.

To use the multiple power driven depositor just described and indicated in Figs. 8 to 10 inclusive, the operator first fills the filling tank 245 with the liquid or semi-frozen confection. The electric motor 220 is started, and with the rotations of its armature shaft 221, the lever having the arms 213 and 214 is oscillated. The coaction of the pawl 215 with the ratchet wheel 210 turns the latter and the member 200 of the conveyer, and is thereby intermittently moved in the direction of the arrow A, Fig. 8. During the movement of the conveyer having the members 200 and 201, the shaft 227 is turned. With the rotations of the shaft 227, the shaft 226 is also turned through the intervention of the sprocket chain 230. The roller 233 turns with the shaft 226 and thereby the member 238 of the belt is also moved in the direction of the arrow A. It will be noted by reason of the ratio of the diameters of the sprocket chain wheels 228 and 229, that the same linear speeds are imparted to the conveyer and said belt. With the rotations of the shaft 227, the crank 231 is revolved, thereby, through the intervention of the connecting rod 258, the lever having the arms 253 and 254 is oscillated. By this means, the circular plate valves 260 and 265 are reciprocated in opposite directions. When the valve 260 is in its open position relatively to the discharge nozzle 246, the plate valve 265 is in its closed position. In this position of the valves the liquid or semi-frozen confection from the tank 245 drops into the discharge nozzle 246. When the plate valve 260 is in its closed position, the valve 265 is in its open position and the supply of the confection in the tank 245 is cut off and the contents of the discharge nozzle 246 drops into the shell 30 that is in alignment with said discharge nozzle. The operation of the ratchet wheel 210 with its coacting pawl 215 is such as to locate the shells 30 in proper position and in alignment with the discharge nozzle 246 at the proper interval. It is to be noted that the shells 30 with their sticks 35 are placed in proper position on the conveyer and the belt, before the confection from the discharge nozzle 246 is discharged from the latter. While the member 238 travels in the direction of the arrow A and when it bears upon the inclined guide plate 271, it is raised as plainly shown in Fig. 8, thereby the shells 30 with their sticks 35 are raised to enable the operator to remove said shells from the conveyer after they have been filled.

Referring to Figs. 11 and 12, there is indicated a multiple manually operated depositor and receiving apparatus for the shells which latter operates in conjunction with a power driven conveyer. A pair of brackets 300, one of which is shown, has journalled therein the shaft 301 on which is fastened the ratchet wheel 302. A pulley 303 is fastened to said shaft 301. A lever having the arms 306 and 307 is pivoted on the shaft 301. A pawl 310 is pivoted to the outer end of the arm 306. There is also indicated a pair of brackets 315 of which one is shown. A shaft 316 is journalled in the brackets 315 and has fastened thereto the pulley 317. A conveyer having the upper member 320 and the lower member 321 connects the pulleys 303 and 317. Guide strips 322 are secured crosswise to the outer face of the said conveyer. An electric motor is indicated at 325 with its armature shaft 326. A crank 327 has one end thereof fastened to the armature shaft 326. A connecting rod 328 has its ends pivoted to the arm 307 and the crank 327. Above the conveyer is positioned the filling tank 330 similar to 245, and from which extend in line with openings in its bottom wall a plurality of discharge nozzles 336, in this instance twelve. From each discharge nozzle 336 extends a bracket 337. In each bracket 337 is pivoted a lever having the arms 339 and 340, by means of the pivot 341. The upper ends of the arms 339 are connected by cross-bars 343. The said bars 343 are connected by the longitudinal bars 344. From one of the bars 343 extends the operating handle 345. A plurality of circular plate valves 346 are pivoted to each of the bars 343. The said valves 346 are adapted to enter the discharge nozzles 336 through openings in the latter. To the lower end of each of the arms 340 is pivoted a similar circular valve 348. The latter valves are adapted to enter the discharge nozzles 336 through openings therein. A plurality of boxes 90a with their partitions 95 and shells 30 and their sticks 35, as already described, are positioned on the upper member 320 of the conveyer between the guide strips 322.

To operate this modification of the depositor, the operator starts the electric motor 325, and through the intervention of the lever having the arms 306 and 307, the pawl 310 and the ratchet wheel 302, the member 320 of the conveyer is moved in the direction of the arrow A1. The liquid or semi-frozen confection is placed into the tank 330 and is maintained therein by locating the valves 346 within the discharge nozzles 336, which is accomplished by pushing the handle 345 towards said nozzles. The boxes 90a with their contents are positioned in place between the guide strips 322 upon the conveyer on which they are moved intermittently. When the boxes 90a are respectively under the discharge nozzles 336, with the shells 30 axially in line therewith the operator pushes the handle 345 from the position indicated in Fig. 11 to enter the valves 346 into the said discharge nozzles. At the same time the valves 348 are withdrawn from said nozzles and the charges of the liquid or semi-frozen confection in the discharge nozzles fall into the shells 30, at which instant the valves 346 are positioned in their closed position. The conveyer continues to move and the operator removes the boxes 90a with their contents therefrom.

Various modifications may be made in the invention, and the present exemplifications are to be taken as illustrative and not limitative thereof.

We claim:

1. For confections in combination, a box, a partition having openings within said box, adapted to position shells for confections within said box and extending through the openings of said partitions, each of said shells having a supporting stick extending with its bottom end bearing on the bottom of said box, a depositor positioned above said box, said depositor comprising a filling tank, a bottom wall for said tank having openings, discharge nozzles extending from said tank and axially in line with said openings, a valve hinged to the lower open end of each discharge nozzle, a spring for each valve with one end thereof fastened to its nozzle and its other end bearing up against said nozzle door, operating bars positioned below said filling tank, vertical members extending from each of said bars, an operating handle connecting each pair of vertical members, U-shaped connecting bars extending from said operating bars and a hook end at the lower portions of the U-shaped connecting bars extending through openings in extensions of said valves.

2. For confections the combination in a multiple manually operated depositor, a filling tank, a plurality of moulds below the tank, a bottom wall for the tank having openings, discharge nozzles extending from said tank and axially in line with said openings, a valve hinged to the lower open end of each discharge nozzle, a spring for each valve with one end thereof fastened to its nozzle and its other end bearing up against said valve, operating bars positioned below said tank, vertical members extending from each of said bars an operating handle connecting each pair of vertical members, U-shaped connecting bars extending from said operating bars and a hook end at the lower portions of the U-shaped connecting bars extending through openings in extensions of said valves.

3. In a multiple manually operated depositor the combination of a filling tank for a material to be deposited therefrom at intervals, discharge nozzles extending from said tank, a valve hinged to the lower open end of each discharge nozzle, an extension having an opening integral with each valve, a spring for each valve having one end thereof fastened to its nozzle and its other end bearing up against said valve, operating bars positioned below said filling tank, vertical members extending up from each of said bars, an operating handle connecting said vertical members, a pair of connecting bars extending from each operating bar and a hook at the lower end of each connecting bar extending through the opening of the extension of its adjacent valve.

LEO OVERLAND.
BENJAMIN BRENNER.